United States Patent
Narala et al.

(10) Patent No.: US 11,320,855 B1
(45) Date of Patent: May 3, 2022

(54) DEBUG TRACE TIME STAMP CORRELATION BETWEEN COMPONENTS

(71) Applicant: QUALCOMM INCORPORATED, San Diego, CA (US)

(72) Inventors: Naveen Kumar Narala, Bengaluru (IN); Matthew Severson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/131,909

(22) Filed: Dec. 23, 2020

(51) Int. Cl.
*G06F 1/12* (2006.01)

(52) U.S. Cl.
CPC ...................... *G06F 1/12* (2013.01)

(58) Field of Classification Search
CPC ................ G06F 1/32; G06F 1/12; G06F 9/44
See application file for complete search history.

(56) References Cited

U.S. PATENT DOCUMENTS

| | | | |
|---|---|---|---|
| 6,614,277 B1* | 9/2003 | Martini ...................... | G06F 1/32 327/227 |
| 7,098,715 B2 | 8/2006 | Severson | |
| 8,433,944 B2 | 4/2013 | Das et al. | |
| 8,447,007 B2 | 5/2013 | Severson | |
| 2016/0139625 A1* | 5/2016 | Worrell ..................... | G06F 1/10 713/401 |
| 2017/0286827 A1* | 10/2017 | Chen ....................... | G06N 3/063 |
| 2018/0343619 A1* | 11/2018 | Callaway, Jr. ............ | G06F 1/32 |
| 2019/0339757 A1* | 11/2019 | Roy .......................... | G06F 1/26 |

* cited by examiner

*Primary Examiner* — Keshab R Pandey
(74) *Attorney, Agent, or Firm* — Smith Tempel Blaha LLC/Qualcomm

(57) ABSTRACT

Debug time stamp counters in a computing device may be synchronized based on signals indicating awakening of a component of the computing device from a sleep state. A count from a global counter in a first component may be loaded into a replica global counter in a second component. The count from the global counter may be loaded into a first debug time stamp counter in the first component in response to a first preload signal indicating awakening of the first component from a sleep state or in response to a second preload signal indicating awakening of the second component from a sleep state. The count from the replica global counter may be loaded into a second debug time stamp counter in the second component in response to the second preload signal.

30 Claims, 9 Drawing Sheets

DEBUG TRACE TIME STAMP CORRELATION BETWEEN COMPONENTS

DESCRIPTION OF THE RELATED ART

Portable computing devices ("PCD"s) are becoming necessities for people on personal and professional levels. These devices may include mobile phones, tablet computers, palmtop computers, portable digital assistants ("PDA"s), portable game consoles, and other portable electronic devices. PCDs commonly contain integrated circuits or systems-on-a-chip ("SoC"s) that include numerous components or subsystems designed to work together to deliver functionality to a user. For example, an SoC may contain any number of processing engines, such as central processing units ("CPU"s) with multiple cores, graphical processing units ("GPU"s), digital signal processors ("DSP"s), neural processing units ("NPU"s), wireless transceiver units (also referred to as modems), etc. In some complex SoCs, subsystems may be implemented using so-called "chiplet" technology. The various SoC subsystems may communicate with each other via one or more intra-chip data buses or similar data communication interconnects. A PCD may have multiple SoCs that communicate with each other via similar inter-chip interconnects.

During the process of integrating SoC hardware and software, or integrating multiple SoCs in a PCD design, it is generally necessary to identify and remove errors. This process, commonly referred to as debugging, may involve running the system in a mode in which debugging hardware embedded among the various SoC subsystems is activated to attach time stamps to data packets passing through the subsystems. A subsystem may have time stamp counter circuitry that maintains a count of clock cycles as the system operates, and attaches a time stamp indicating the current count at the time the subsystem processes the packet.

After operating the system in this manner for a period of time, design personnel may review the time-stamped data packets, commonly referred to as debug traces, which reflect the processing performed by the various subsystems at the times indicated by their time stamps. If all subsystems were to operate using the same clock signal, it would be a straightforward matter to correlate the debug traces by their time stamps.

However, such correlation is hampered because subsystem time stamp counters may be clocked by different clock signals at different frequencies. Known solutions to the problem of correlating debug traces from various subsystems operating at different clock frequencies include using software-based tools to attempt to relate the debug traces to a common time base.

SUMMARY OF THE DISCLOSURE

Systems, methods, computer-readable media, and other examples of debug time stamp counter synchronization in a computing device are disclosed herein.

An exemplary method for synchronizing debug time stamp counters in a computing device may include loading a replica global counter in a second component from a first global counter in a first component. The method may also include loading a first debug time stamp counter in the first component from the first global counter in response to a first preload signal indicating awakening of the first component from a sleep state or in response to a second preload signal indicating awakening of the second component from a sleep state. The method may further include loading a second debug time stamp counter in the second component from the replica global counter in response to the second preload signal.

An exemplary system for synchronizing debug time stamp counters in a computing device may include a first component and a second component. The first component may include a first global counter and a first debug time stamp counter. The first component may be configured to produce a first preload signal indicating awakening of the first component from a sleep state and to load the first debug time stamp counter from the first global counter in response to the first preload signal. The second component may include a replica global counter and a second debug time stamp counter. The second component may be configured to produce a second preload signal indicating awakening of the second component from the sleep state. The second component may also be configured to load the second debug time stamp counter from the replica global counter in response to the second preload signal. The second component may further be configured to load the replica global counter from the first global counter. The first component may be configured to load the first debug time stamp counter from the first global counter not only in response to the first preload signal but also in response to the second preload signal.

Another exemplary system for synchronizing debug time stamp counters in a computing device may include: means for loading a replica global counter in a second component from a first global counter in a first component; means for loading a first debug time stamp counter in the first component from the first global counter in response to a first preload signal indicating awakening of the first component from a sleep state or in response to a second preload signal indicating awakening of the second component from a sleep state; and means for loading a second debug time stamp counter in the second component from the replica global counter in response to the second preload signal.

An exemplary computer-readable medium for synchronizing debug time stamp counters in a computing device may comprise a non-transitory computer-readable medium having instructions stored thereon in computer-executable form. The instructions, when executed by a processing system of the computing device, may configure the processing system to load a replica global counter in a second component from a first global counter in a first component.

The instructions, when executed by the processing system, may also configure the processing system to load a first debug time stamp counter in the first component from the first global counter in response to a first preload signal indicating awakening of the first component from a sleep state or in response to a second preload signal indicating awakening of the second component from the sleep state. The instructions, when executed by the processing system, may further configure the processing system to load a second debug time stamp counter in the second component from the replica global counter in response to the second preload signal.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects. The term "coupled" may be used herein to mean connected via zero or more intervening elements, in contrast with the term "directly connected," which may be used herein to mean connected via no intervening elements.

Figure 1:
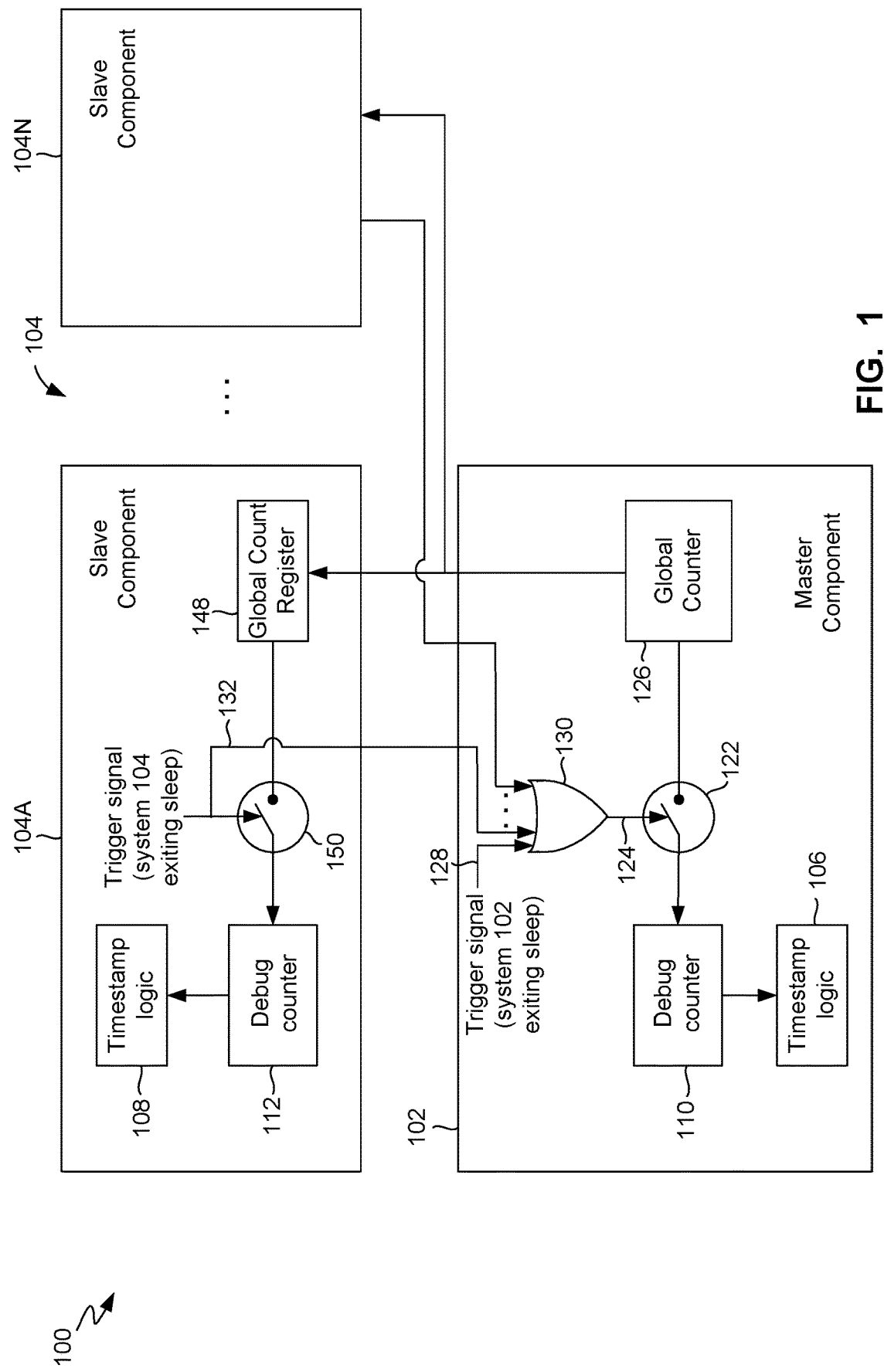
FIG. 1 is a block diagram illustrating a computing device having a system for synchronizing debug time stamp counters, in accordance with exemplary embodiments.

As illustrated in FIG. 1, in an illustrative or exemplary embodiment, a computing device 100 may include a master component 102 and one or more slave components 104A through 104N (collectively referred to as slave components 104). The master component 102 and each slave component 104 may be, for example, a subsystem of the computing device 100, such as, for example, a processing unit (e.g., CPU, GPU, DSP, NPU, etc.), a modem subsystem, etc. The master component 102 and slave components 104 each may be in the form of, for example, an SoC, a chiplet, etc. The components 102 and 104 may communicate data with each other or with other elements of the computing device 100 via one or more data busses or similar interconnects (not shown). The computing device 100 may be of any type, and elements of the computing device 100 that are not directly relevant to the present disclosure are not shown for purposes of clarity. Also not shown for purposes of clarity in FIG. 1 are clock signals, power signals, etc. Nevertheless, it should be noted that the clock signals on which the master component 102 operates may differ in frequency from the clock signal on which the slave components 104 operate. Indeed, in embodiments having two or more slave components 104A-104N, the clock signals on which some of the slave components 104A-104N operate may differ in frequency from the clock signals on which others of the slave components 104A-104N operate.

Each of the components 102 and 104 may be configured to process data packets or other units of data. Each of the components 102 and 104 may include debug features to facilitate analysis of the data packet processing, including correlating, using the times at which the various data packets were processed, data packets processed by one or more of the components 102 and 104 with data packets processed by one or more others of the components 102 and 104. The time at which a data packet was processed may be indicated by a time stamp (not shown) included in the data packet. For purposes of clarity, features relating to the processing of data packets by the various components 102 and 104 that do not directly relate to time stamps are not shown in FIG. 1. The various components 102 and 104 may differ from each other in the way they process data packets or in other ways. Nevertheless, each component 102 and 104 may include the following time stamp features.

Components 102 and 104 may include time stamp logic units 106 and 108, respectively. When a debug mode is enabled, each time stamp logic unit 106 and 108 may insert a time stamp into a data packet processed by the corresponding component 102 and 104.

The master component 102 may include a global counter 126. The global counter 126 maintains a count that is relevant to the entire computing device 100, i.e., "global" to all components 102 and 104 of the computing device 100. Each slave component 104 may include a replica global count register 148. The count maintained by the global counter 126 may be periodically loaded into the replica global count register 148 of each slave component 104, to maintain the replica global count register 148 in synchronism with the global counter 126. For example, the count maintained by the global counter 126 may be loaded into the replica global count register 148 on every cycle of the clock signal (not shown) on which the master component 102 operates. The replica global count register 148 thus mirrors whatever count the global counter 126 holds. The replica global counter register 148 in effect serves as a replica of the global counter 126. Although in this exemplary embodiment the replica global count register 148 is a register, in other embodiments such a replica global counter may have any other structure that serves as a replica of the global counter.

The components 102 and 104 may include debug counters 110 and 112, respectively. The components 102 and 104 may also include debug counter loading and synchronization logic 122 and 150 (shown in conceptual form in FIG. 1), respectively. In response to a preload signal 124, the debug counter loading and synchronization logic 122 may control loading of a count maintained by the global counter 126 into the debug counter 110. Similarly, in response to a preload signal 132, the debug counter loading and synchronization logic 150 may control loading of a count maintained by the replica global count register 148 into the debug counter 112. The preload signals 128 and 132 may be asserted by processors (not shown) in the components 102 and 104, respectively. The debug counter loading and synchronization logic 122 and 150 may, for example, be implemented in part by processors under the control of software.

Another preload signal 128 may indicate that the master component 104 is awakening from a sleep state, i.e., transitioning from a sleep state to an active state. Similarly, the preload signal 132 may indicate that the slave component 104A is awakening from a sleep state. In addition to the preload signal 132 provided by the slave component 104A (i.e., illustrating in FIG. 1 an exemplary one of the slave components 104), similar preload signals may be provided by other slave components 104. The above-referenced preload signal 124 may be the result of a logical-OR 130 of the preload signal 128 provided by the master component 102 and one or more preload signals provided by the slave components 104. Accordingly, when any of the components 102 or 104 exit a sleep state, all of the debug counters 110 and 112 are loaded with the global count value maintained in the global counter 126 and replica global count register 148.

The manner in which sleep states are entered and exited and otherwise controlled in a computing device is well understood by one or ordinary skill in the art and therefore not described herein. Nevertheless, it may be noted that in a sleep state some portions of a component may not be operational. Also, portions that remain operational in the sleep state may be clocked at a lower frequency than the frequency at which they are clocked in the active state.

Figure 2:
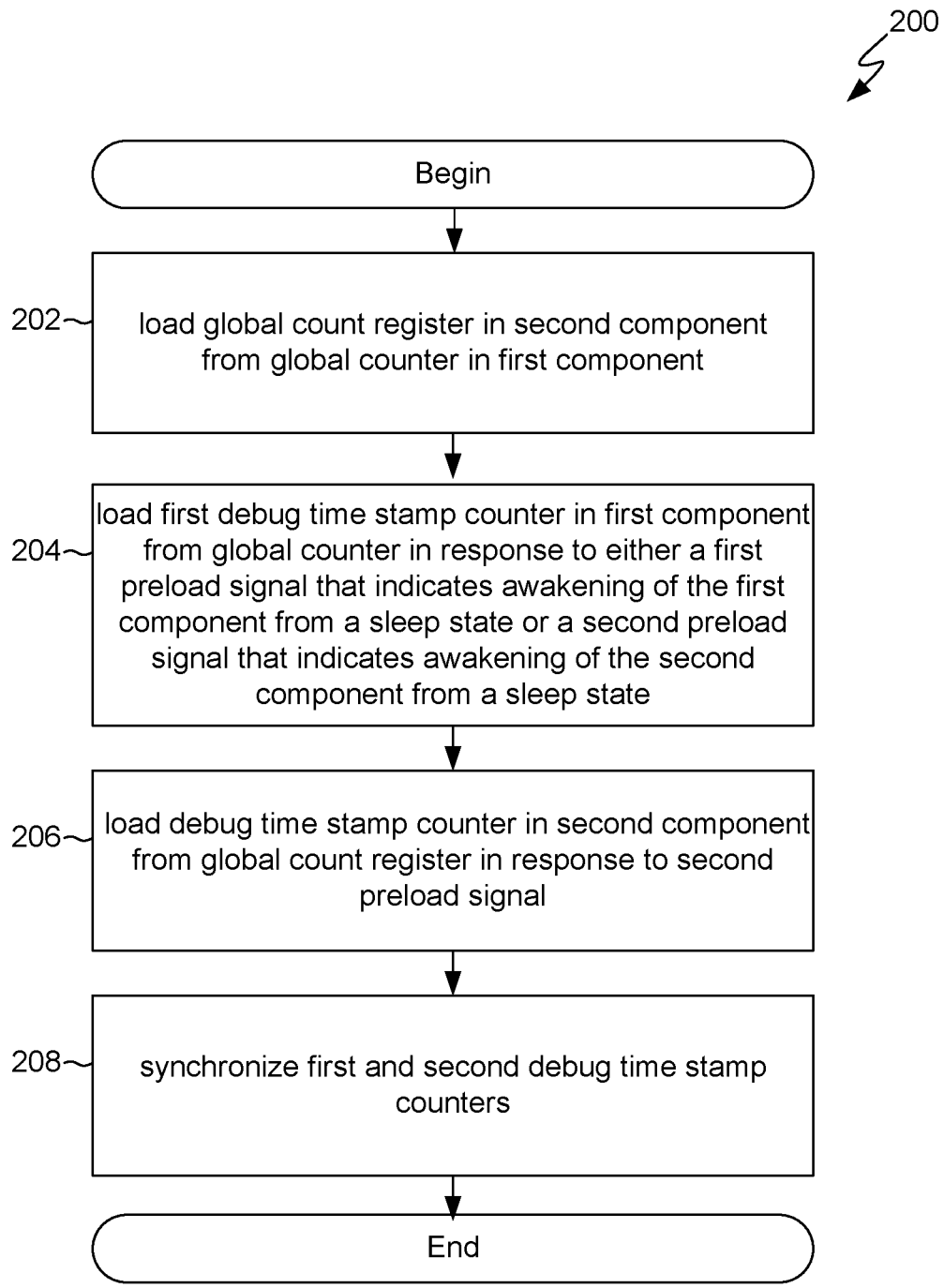
FIG. 2 is a flow diagram illustrating a method for synchronizing debug time stamp counters in a computing device, in accordance with exemplary embodiments.

As illustrated by the flow diagram of FIG. 2, a method 200 for synchronizing debug time stamp counters in a computing device may include the following. As indicated by block 202, the method 200 may include loading a replica global counter in a second component from a first global counter in a first component. For example, the above-described replica global count register 148 (FIG. 1) may be loaded from the global counter 126. This loading may occur periodically, such as every clock cycle, so that in operation the replica global counter is, in effect, a replica of the global counter.

As indicated by block 204, the method 200 may include loading a first debug time stamp counter in the first component from the first global counter in response to either a first preload signal that indicates awakening of the first component from a sleep state or a second preload signal that indicates awakening of the second component from a sleep state. For example, the above-described debug counter 110 (FIG. 1) in the master component 102 may be loaded from the global counter 126 in response to either the first preload signal 128 from the first component 102 or (via the logical-OR 130) the second preload signal 132 from the second component 104. Note that the logical-OR operation may enable synchronizing the debug counters 110 and 112 in instances in which one of the slave components 104 exits a sleep state while the master component 102 is still in a sleep state. When the master component 102 is in a sleep state, a processor (not separately shown) in the master component 102 may not be operable to assert the preload signal 128.

As indicated by block 206, the method 200 may include loading a second debug time stamp counter in the second component from the replica global counter in response to the second preload signal. For example, the above-described debug counter 112 (FIG. 1) in the slave component 104 may be loaded from the replica global count register 148 in response to the preload signal 132.

As indicated by block 208, the method 200 may include synchronizing the first debug time stamp counter in the first component and the second debug time stamp counter in the second component. For example, the above-described debug counters 110 and 112 (FIG. 1) may be synchronized. In the present disclosure, "synchronizing" means configuring two or more debug counters to maintain the same count as each other, regardless of whether the counters may be clocked by clock signals of different frequencies. In addition to the above-referenced second debug time stamp counter in the second component, any number (i.e., zero or more) of further debug time stamp counters in further components may be synchronized. For example, the debug counter 110 of the master component 102 and the debug counter 112 of each of multiple slave components 104A-104N may be synchronized.

Figure 3:
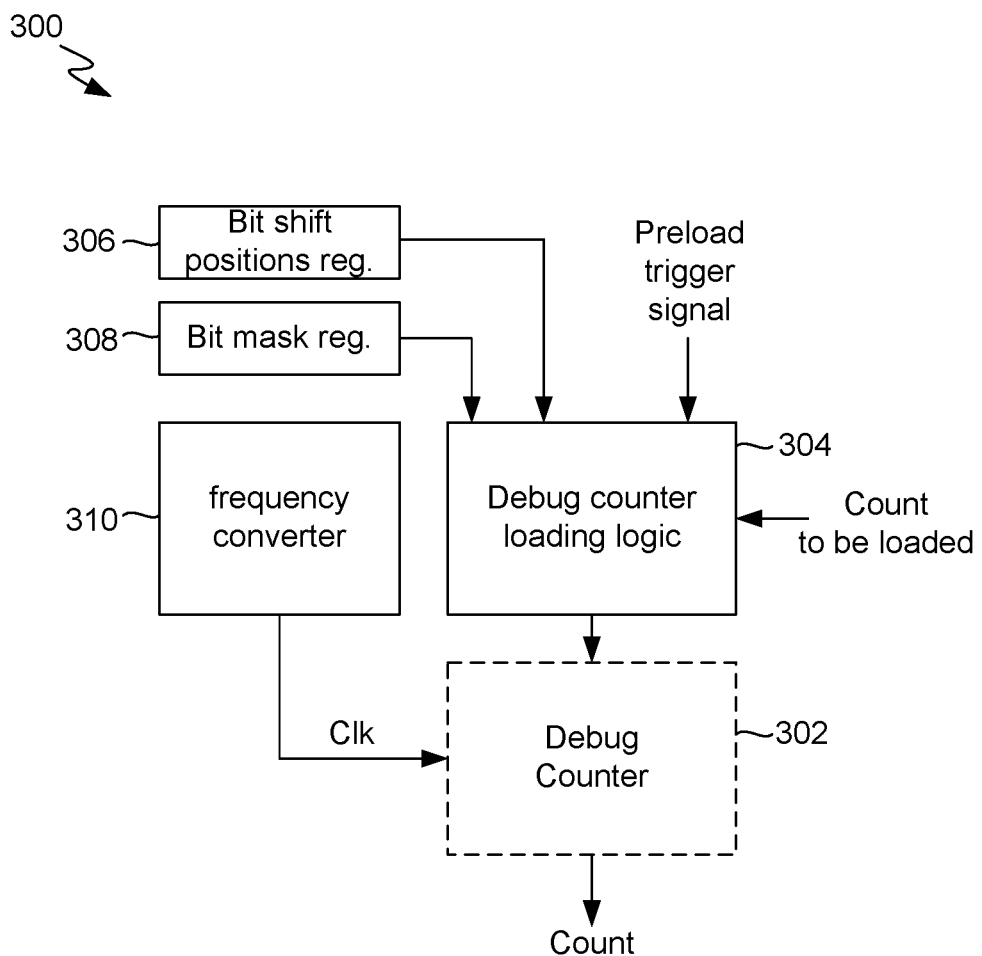
FIG. 3 is block diagram of counter loading and synchronization logic, in accordance with exemplary embodiments.

As illustrated in FIG. 3, debug counter loading and synchronization logic 300 may include debug counter loading logic 304 configured in the manner described below to control loading of a debug counter 302. The debug counter 302 may be the above-described debug counter 110 or 112 (FIG. 1). The debug counter loading logic 304 may be an example of a counter loading-related portion of the above-described debug counter loading and synchronization logic 122 or 150. The debug counter loading logic 304 may receive the count (value) to be loaded, such as, for example, the count maintained by the global counter 126 or the replica global count register 148 (FIG. 1). The debug counter loading logic 304 may also receive a preload trigger signal, such as, for example, the preload signal 124 or 132 (FIG. 1).

The above-described synchronization of two counters may be performed in any manner. In some examples, the clock frequency (f1) on which a first counter operates may be a multiple of an integer power of two of the clock frequency (f2) on which a second counter operates, i.e., $f1=(2^n)*f2$, where the power (n) is an integer greater than zero. In such examples, in which one of the clock frequencies in an integer power-of-two multiple of the other clock frequency, the synchronization may be performed by bit shifting and masking. The debug counter loading logic 304 may include bit shifting and masking logic (not separately shown) to address such examples. The number of bit positions by which the debug counter loading logic 304 shifts the count when loading the count into the debug counter 302 may be indicated to the debug counter loading logic 304 by a value stored in a register 306. The bit positions that the debug counter loading logic 304 masks in the debug counter 302 while the debug counter 302 is counting may be indicated to the debug counter loading logic 304 by a value stored in a register 308. An exemplary bit shifting and masking method is described in further detail below.

In other examples, the clock frequency on which a first debug time stamp counter operates may not be a multiple of an integer power of two of the clock frequency on which a second debug time stamp counter operates. The debug counter loading and synchronization logic 300 may include a frequency converter 310 to provide synchronization in such examples. As described below, the frequency converter 310 may generate and provide to a first debug counter (e.g., the debug counter 302) a clock signal having the same frequency (or average frequency) as the frequency of the clock signal provided to a second debug counter (not shown in FIG. 3).

The registers 306 and 308 may be loaded in a manner described below at any time, such as during a device configuration portion of a boot process by which the device 100 (FIG. 1) begins operating after powering up, being reset, etc. The frequency converter 310 may be configured to divide a clock frequency by a number that results in synchronization. The frequency converter 310 may be configured in a manner described below and at any time, such as during a boot process.

Figure 4:
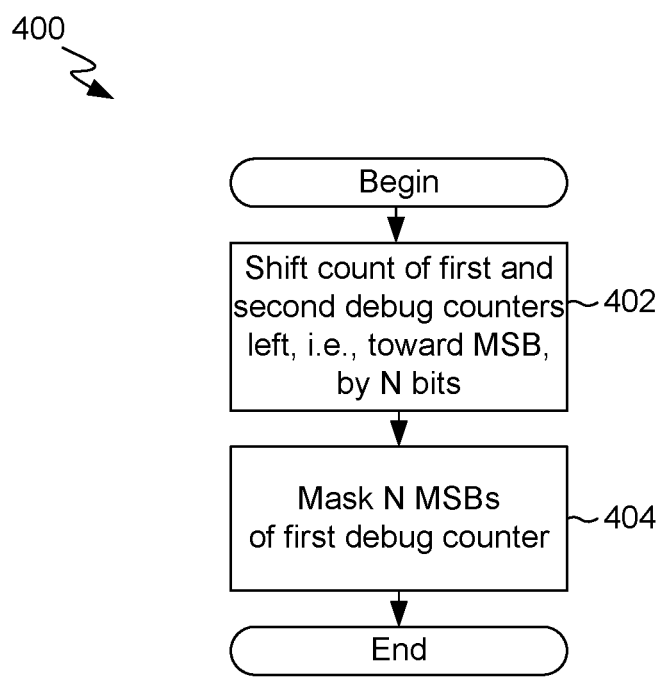
FIG. 4 is a flow diagram illustrating a bit shifting and masking method for synchronizing debug time stamp counters in a computing device, in accordance with exemplary embodiments.

In FIG. 4, a method 400 is illustrated for synchronizing first and second debug counters in instances in which the clock frequency (f2) of the second debug counter is an integer power-of-two multiple of the clock frequency (f1) of the first debug counter, i.e., $f2=(2^n)*f1$. In the following description of the method 400, the debug counters 110 and 112 (FIG. 1) are used as examples of the first and second debug time stamp counters, respectively. That is, in this example of the method 400 the debug counter 112 is clocked at a higher frequency than the debug counter 110. Nevertheless, in other examples of the method 400, the debug counter 110 may clocked at a higher frequency than the debug counter 112. Also, in an embodiment having more than one slave component 104, the debug counter 112 may be that of any of the slave components 104. Further, in an embodiment having more than one slave component 104, the method may be applied to two or more of the slave components 104, so that their debug counters 112 are synchronized with the debug counter 110 of the master component 102.

As indicated by block 402, in an example in which the clock frequency of the debug counter 110 is an integer power-of-two multiple of the clock frequency of the debug counter 112, then the count in the debug counter 110 may be shifted left by n bit positions, and the count in the debug counter 112 likewise may be shifted left by n bit positions. Shifting a count "left" means, as understood by one of ordinary skill in the art, toward the most-significant bit ("MSB") position. Absent shifting, the count in the debug counter 110 occupies the same bit positions as that count occupies in the global counter 126, and the count in the debug counter 112 occupies the same bit positions as that count occupies than the replica global count register 148. The global counter 126 and replica global count register 148 each may have a greater number of bits than the debug counters 110 and 112, respectively, to accommodate the shifting. For example, the global counter 126 and replica global count register 148 each may consist of 56 bits, and the debug counters 110 and 112 each may consist of 64 bits, which accommodates shifting by a number of bit positions in a range from one to eight. Examples of the bit shifting to which block 402 relates are described below.

In some embodiments, the bit shifting (block 402) may be performed after a count is loaded. However, in other embodiments the shifting and loading may be performed simultaneously as a single operation, such that the count from the global counter 126 is loaded into different bit positions in the debug counter 110 than that count occupies in the global counter 126, and the count from the replica global count register 148 is loaded into different bit positions in the debug counter 112 than that count occupies in the replica global count register 148.

Following the loading of the debug counters 110 and 112, either by loading into shifted bit positions or by first loading and then shifting, the debug counters 110 and 112 may continue counting, beginning at the count that was loaded. However, the n right-most or least-significant bits ("LSB"s) of the first debug counter (debug counter 110 in this example) are masked as indicated by block 404 (FIG. 2). The term "masked" refers to restricting those bits to a value of zero while the first debug counter counts. Thus, when a bit-shifted count from the debug counter 110 is output, i.e., provided to the time stamp logic 106 (FIG. 1), the n LSBs of the output count are zeros. Masked bits of the first debug counter (debug counter 110 in this example) remain masked so long as counting continues, until such time as the debug counters 110 and 112 may again be loaded and the method 400 again may be performed.

Figure 5:
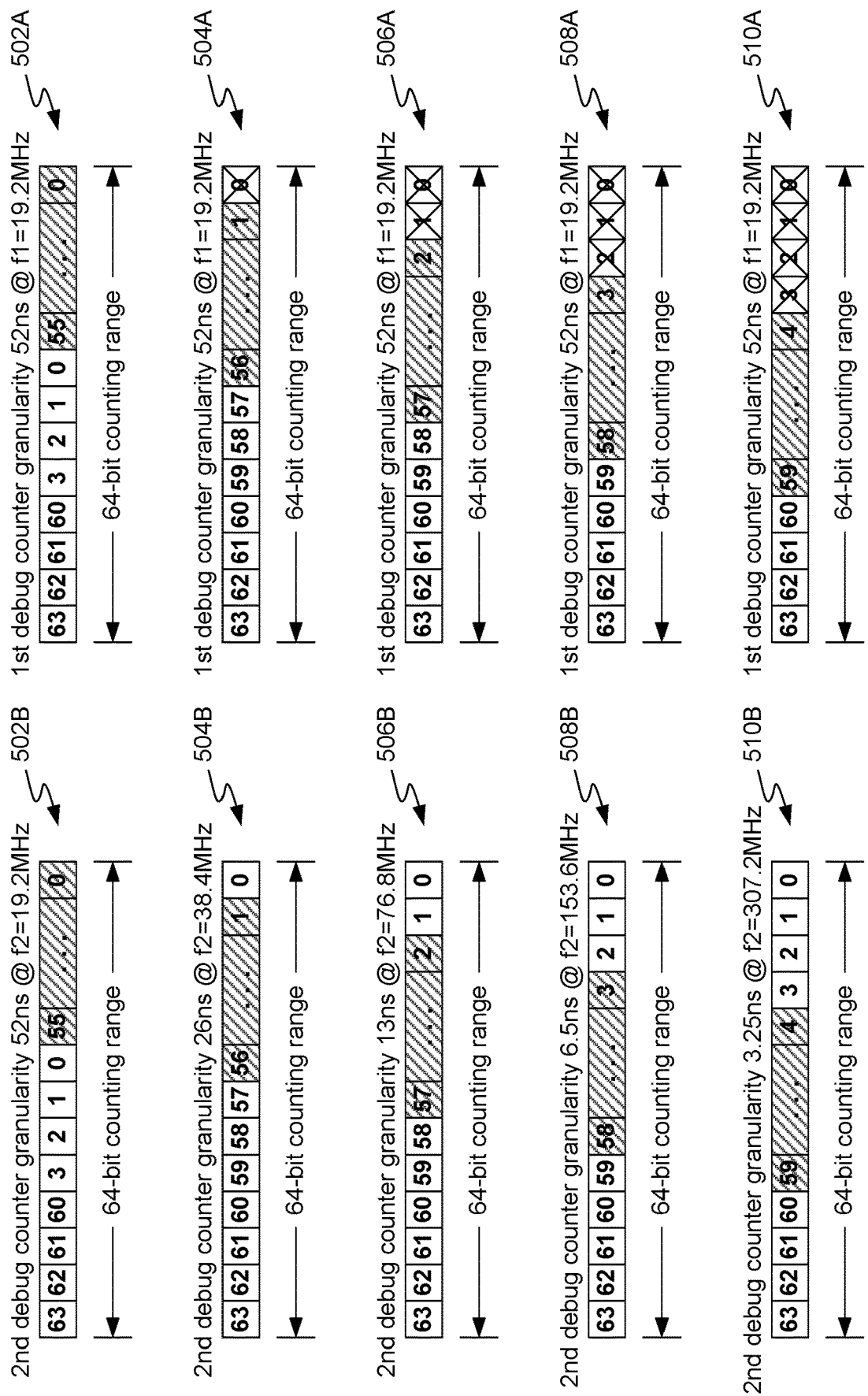
FIG. 5 is a conceptual diagram illustrating bit shifting and masking in debug time stamp counters, in accordance with exemplary embodiments.

In FIG. 5, five examples illustrating the shifting and masking described above with regard to block 402 and 404 (FIG. 4), respectively, are shown. A first example illustrates, for purposes of comparison, a case in which no shifting is performed. In the first example, the clock frequency (f1) of the first debug counter (debug counter 110 in this example) may be 19.2 MHz, and the clock frequency (f2) of the second debug counter (debug counter 112 in this example) may also be 19.2 MHz. In this first example, the 56-bit count from the global counter 126, indicated in cross-hatching, is loaded into the least-significant 56 bit positions of the 64 bit positions 502A of the debug counter 110. That is, the 56-bit count from the global counter 126, indicated in cross-hatching, occupies bit positions 0 through 55 among the 64 bit positions 502A of the debug counter 110. Similarly, in this first example, the 56-bit count from the replica global count register 148, indicated in cross-hatching, is loaded into the least-significant 56 bit positions of the 64 bit positions 502B of the debug counter 112. That is, the 56-bit count from the replica global count register 148, indicated in cross-hatching, occupies bit positions 0 through 55 among the 64 bit positions 502B of the debug counter 112. It may be noted that a frequency of 19.2 MHz equates to a count granularity, i.e., clock period per bit, of 52 ns: 1/19.2 MHz=52 ns.

A second example illustrates a case in which shifting is performed because it is determined that the clock frequency (f1) of the first component debug counter (debug counter 110 in this example) is, for example, 19.2 MHz, and the clock frequency (f2) of the second component debug counter (debug counter 112 in this example) is, for example, 38.4 MHz, which is two times f1. That is, in this second example $f2=2^1 \times f1$. As the power of two is one (i.e., n=1) in this second example, the 56-bit count from the global counter 126, indicated in cross-hatching, is left-shifted by one bit position in the 64 bit positions 504A of the debug counter 110. That is, the 56-bit count from the global counter 126, indicated in cross-hatching, is shifted to occupy bit positions 1 through 56 among the 64 bit positions 504A of the debug counter 110. Similarly, in this second example, the 56-bit count from the replica global count register 148, indicated in cross-hatching, is left-shifted by one bit position in the 64 bit positions 504B of the debug counter 112. That is, the 56-bit count from the replica global count register 148, indicated in cross-hatching, is shifted to occupy bit positions 1 through 56 among the 64 bit positions 504B of the debug counter 112. Bit position 0 of the 64 bit positions 504A of the debug counter 110 is masked (indicated in FIG. 5 by being crossed ("X") out), while bit position 0 of the 64 bit positions 504B of the debug counter 112 is not masked. It may be noted that a frequency of 38.4 MHz equates to a count granularity of 26 ns: 1/38.4 MHz=26 ns.

A third example illustrates a case in which shifting is performed because it is determined that the clock frequency (f1) of the first debug counter (debug counter 120 in this example) is, for example, 19.2 MHz, and the clock frequency (f2) of the second debug counter (debug counter 146 in this example) is, for example, 76.8 MHz, which is four times f1. That is, in this second example $f2=2^2 \times f1$. As the power of two is two (i.e., n=2) in this third example, the 56-bit count from the global counter 126, indicated in cross-hatching, is left-shifted by two bit positions in the 64 bit positions 506A of the debug counter 110. That is, the 56-bit count from the global counter 126, indicated in cross-hatching, is shifted to occupy bit positions 2 through 57 among the 64 bit positions 506A of the debug counter 110. Similarly, in this third example, the 56-bit count from the replica global count register 148, indicated in cross-hatching, is left-shifted by two bit positions in the 64 bit positions 506B of the debug counter 112. That is, the 56-bit count from the replica global count register 148, indicated in cross-hatching, is shifted to occupy bit positions 2 through 57 among the 64 bit positions 406B of the debug counter 112. Bit positions 0 to 1 of the 64 bit positions 506A of the debug counter 110 are masked, while bit positions 0 to 1 of the 64 bit positions 506B of the debug counter 112 are not masked. It may be noted that a frequency of 76.8 MHz equates to a count granularity of 13 ns: 1/76.8 MHz=13 ns.

A fourth example illustrates a case in which shifting is performed because it is determined that the clock frequency (f1) of the first debug counter (debug counter 120 in this example) is, for example, 19.2 MHz, and the clock frequency (f2) of the second debug counter (debug counter 146 in this example) is, for example, 153.6 MHz, which is eight times f1. That is, in this second example f2=$2^3$×f1. As the power of two is three (i.e., n=3) in this fourth example, the 56-bit count from the global counter 126, indicated in cross-hatching, is left-shifted by three bit positions in the 64 bit positions 508A of the debug counter 110. That is, the 56-bit count from the global counter 126, indicated in cross-hatching, is shifted to occupy bit positions 3 through 58 among the 64 bit positions 508A of the debug counter 110. Similarly, in this fourth example, the 56-bit count from the replica global count register 148, indicated in cross-hatching, is left-shifted by three bit positions in the 64 bit positions 508B of the debug counter 112. That is, the 56-bit count from the replica global count register 148, indicated in cross-hatching, is shifted to occupy bit positions 3 through 58 among the 64 bit positions 508B of the debug 112 146. Bit positions 0 to 2 of the 64 bit positions 508A of the debug counter 110 are masked, while bit positions 0 to 2 of the 64 bit positions 508B of the debug counter 112 are not masked. It may be noted that a frequency of 153.6 MHz equates to a count granularity of 6.5 ns: 1/153.6 MHz=6.5 ns.

A fifth example illustrates a case in which shifting is performed because it is determined that the clock frequency (f1) of the first debug counter (debug counter 120 in this example) is, for example, 19.2 MHz, and the clock frequency (f2) of the second debug counter (debug counter 146 in this example) is, for example, 307.2 MHz, which is 16 times f1. That is, in this second example f2=$2^4$×f1. As the power of two is four (i.e., n=4) in this fifth example, the 56-bit count from the global counter 126, indicated in cross-hatching, is left-shifted by four bit positions in the 64 bit positions 510A of the debug counter 110. That is, the 56-bit count from the global counter 126, indicated in cross-hatching, is shifted to occupy bit positions 4 through 59 among the 64 bit positions 510A of the debug counter 110. Similarly, in this fifth example, the 56-bit count from the replica global count register 148, indicated in cross-hatching, is left-shifted by four bit positions in the 64 bit positions 510B of the debug counter 112. That is, the 56-bit count from the replica global counter 148, indicated in cross-hatching, is shifted to occupy bit positions 4 through 59 among the 64 bit positions 510B of the debug counter 112. Bit positions 0 to 3 of the 64 bit positions 510A of the debug counter 110 are masked, while bit positions 0 to 3 of the 64 bit positions 510B of the debug counter 112 are not masked. It may be noted that a frequency of 153.6 MHz equates to a count granularity of 6.5 ns: 1/153.6 MHz=6.5 ns.

Frequency conversion may be employed to synchronize first and second debug counters. In the exemplary embodiment described herein, frequency conversion may be used instead of the above-described bit shifting and masking in instances in which the clock frequency (f2) of the second debug counter is not an integer power-of-two multiple of the clock frequency (f1) of the first debug counter. Nevertheless, in other embodiments frequency conversion may be used regardless of the relationship between f2 and f1.

Figure 6:
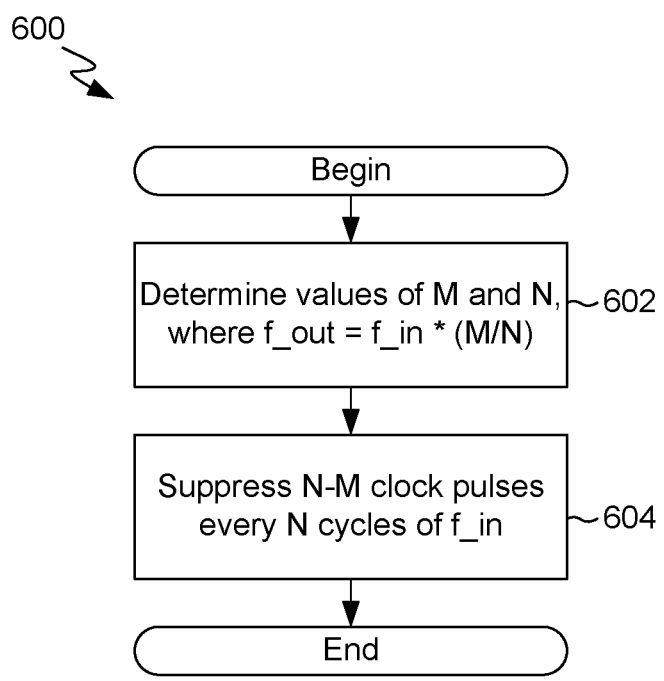
FIG. 6 is a flow diagram illustrating a frequency conversion method for synchronizing debug time stamp counters in a computing device, in accordance with exemplary embodiments.

As illustrated in FIG. 6, an exemplary frequency conversion method 600 may employ a technique sometimes referred to as "pulse swallowing," where an input clock frequency (f_in) is reduced to an output clock frequency (f_out) by suppressing or "swallowing" N-M clock pulses of the input clock signal every N cycles of the input clock signal (or conversely, by enabling only M out of N clock pulses). The method 600 may be applied to a second debug counter to reduce the frequency at which it is clocked to match the frequency of a first debug counter. For example, in an instance in which the debug counter 112 (FIG. 1) is clocked at a higher frequency than the debug counter 110, the method 600 may be used to reduce the frequency of the clock signal on which the debug counter 112 operates. Nevertheless, in other examples of the method 600, in which the debug counter 110 is clocked at a higher frequency than the debug counter 112, the method 600 may be used to reduce the frequency of the clock signal on which the debug counter 110 operates. Although the foregoing description refers to two (i.e., first and second) debug counters, the method 600 may be applied to any number of debug counters to synchronize them with each other.

As indicated by block 602, a value of M and a value of N may be determined. The values of M and N may be determined in any manner. For example, M and N may be mutual prime numbers (also known as relative prime numbers) and may be determined by, beginning with M=f_in and N=f_out, iteratively reducing them to the last possible limit by cancelling common factors.

As indicated by block 604, an output clock signal having the above-referenced frequency f_out may be produced by suppressing N-M clock pulses of the input clock signal having the above-referenced frequency f_in every N cycles of the input clock signal.

Figure 7:
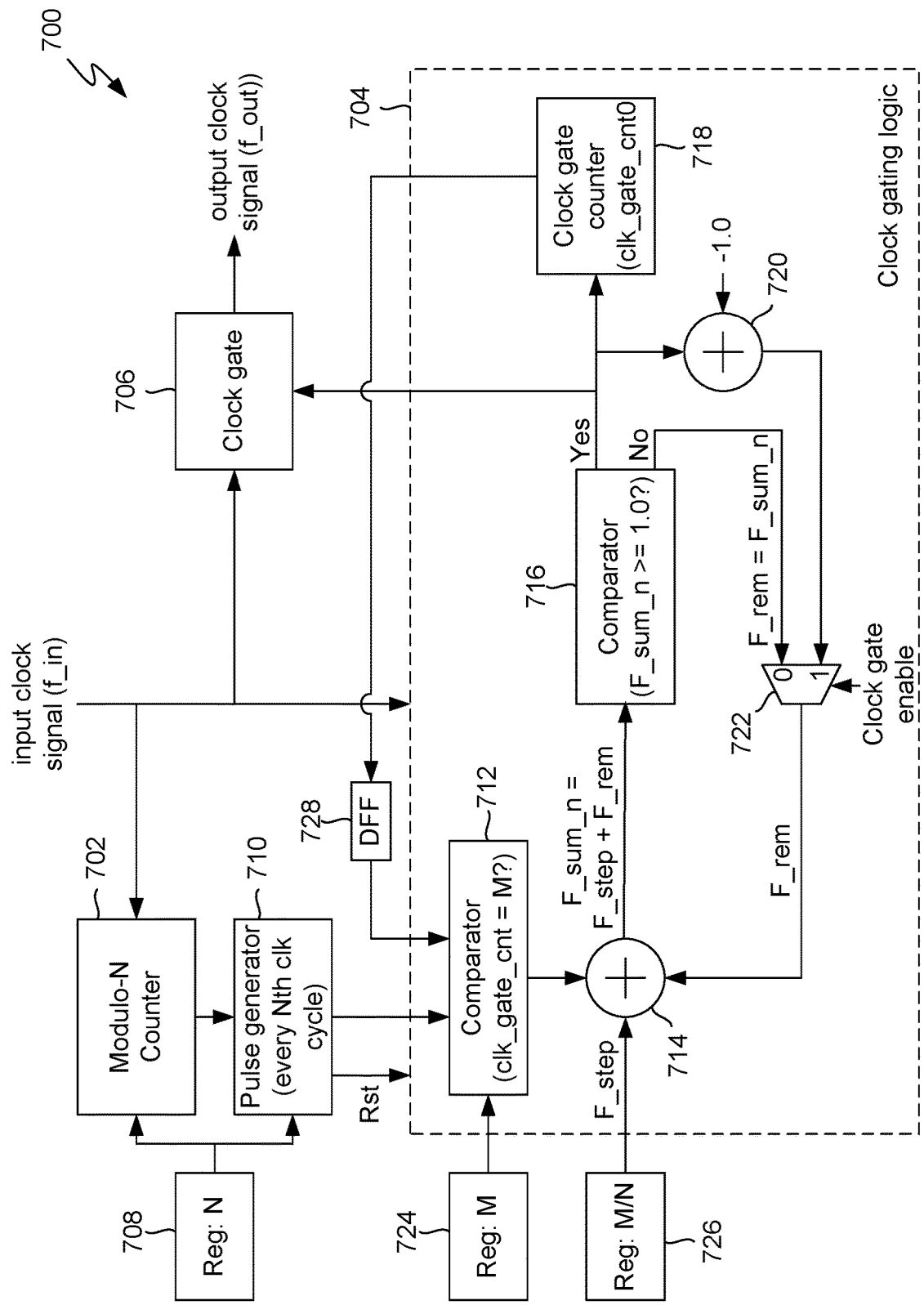
FIG. 7 is a block diagram of a frequency converter, in accordance with exemplary embodiments.

As illustrated in FIG. 7, an exemplary frequency converter 700 may include a modulo-N counter 702, clock gating logic 704, and a clock gate 706. The modulo-N counter 702 may be configured with the value of N from a register 708. The modulo-N counter 702 is clocked by the input clock signal, which has a frequency of f_in. The modulo-N counter 702 is thus configured to repeatedly count N cycles of the input clock signal. The frequency converter 700 may also include a pulse generator 710 coupled to the output of the modulo-N counter 702 that may generate a pulse every Nth cycle of the input clock signal.

The clock gating logic 704 may include a comparator 712, a summing circuit or adder 714, another comparator 716, a clock gate counter 718, another summing circuit or adder 720, and a multiplexer 722. The comparator 712 may be configured to compare the count maintained by the clock gate counter 718 with the value of M and output a value of "1" if the count (clk_gate_cnt) is equal to M. The comparator 712 may obtain the value of M from a register 724.

When the comparator outputs a value of "1," indicating that clk_gate_cnt is equal to M, the comparator output enables the adder 714 to output the sum of a step value (F_step) and a remainder value (F_rem). That is: F_sum_n=F_step+F_rem. The step value is equal to M/N, which the adder 714 may receive from a register 726. The registers 708, 724 and 726 may be loaded by a processor and may be loaded at any time, such as during a boot process.

The comparator 716 may be configured to compare the output of the adder 714, F_sum_n, with a value of "1." If the comparator 716 determines that F_sum_n is greater than or equal to "1," then the comparator 716 outputs a pulse (i.e., a value of "1" for one cycle of the input clock signal) that clocks the clock gate counter 718. In response to being clocked, the clock gate counter 718 increments its count (clk_gate_cnt). Note that the clock gate counter 718 and other circuitry of the clock gating logic 704 are reset in response to the output of the pulse generator 710 (Rst), i.e., every Nth cycle of the input clock signal. The comparator 716 outputting a pulse (i.e., a value of "1" for one cycle of the input clock signal) also causes the clock gate 706 to gate or suppress one cycle of the input clock signal. Also, the count (clk_gate_cnt) of the clock gate counter 718 may be passed to an input of the comparator 712 via a D-type flip-flop 728.

If the comparator 716 determines that F_sum_n is not greater than or equal to "1," then the remainder value (F_rem) is set to the sum value (F_sum_n). The multiplexer 722 passes the remainder value (F_rem) to an input of the adder 714 so long as the multiplexer selector input (clk_gate_en) has a value of "0." If the multiplexer selector input (clk_gate_en) has a value of "1," the multiplexer 722 passes the output of the adder 720 to the input of the adder 714. The output of the adder 720 is equal to the output of the comparator 716 minus "1." Therefore, if the multiplexer selector input (clk_gate_en) has a value of "1," the multiplexer 722 passes a value of "0" to the input of the adder 714, resulting in the output clock signal not being reduced in frequency (i.e., f_out remains equal to fin).

In an example of operation of the frequency converter 700, it may be desired to reduce the frequency (f_in) of clock signal from 20 MHz to 7.5 MHz. Values of 3 and 8 may be selected for M and N, respectively. In accordance with the above-described frequency conversion method 600 or operation of the above-described frequency converter 700, three clock cycles of the input clock signal may be suppressed every eight cycles of the input clock signal, resulting in an output clock signal having an average frequency (f_out) of 7.5 MHz.

Figure 8:
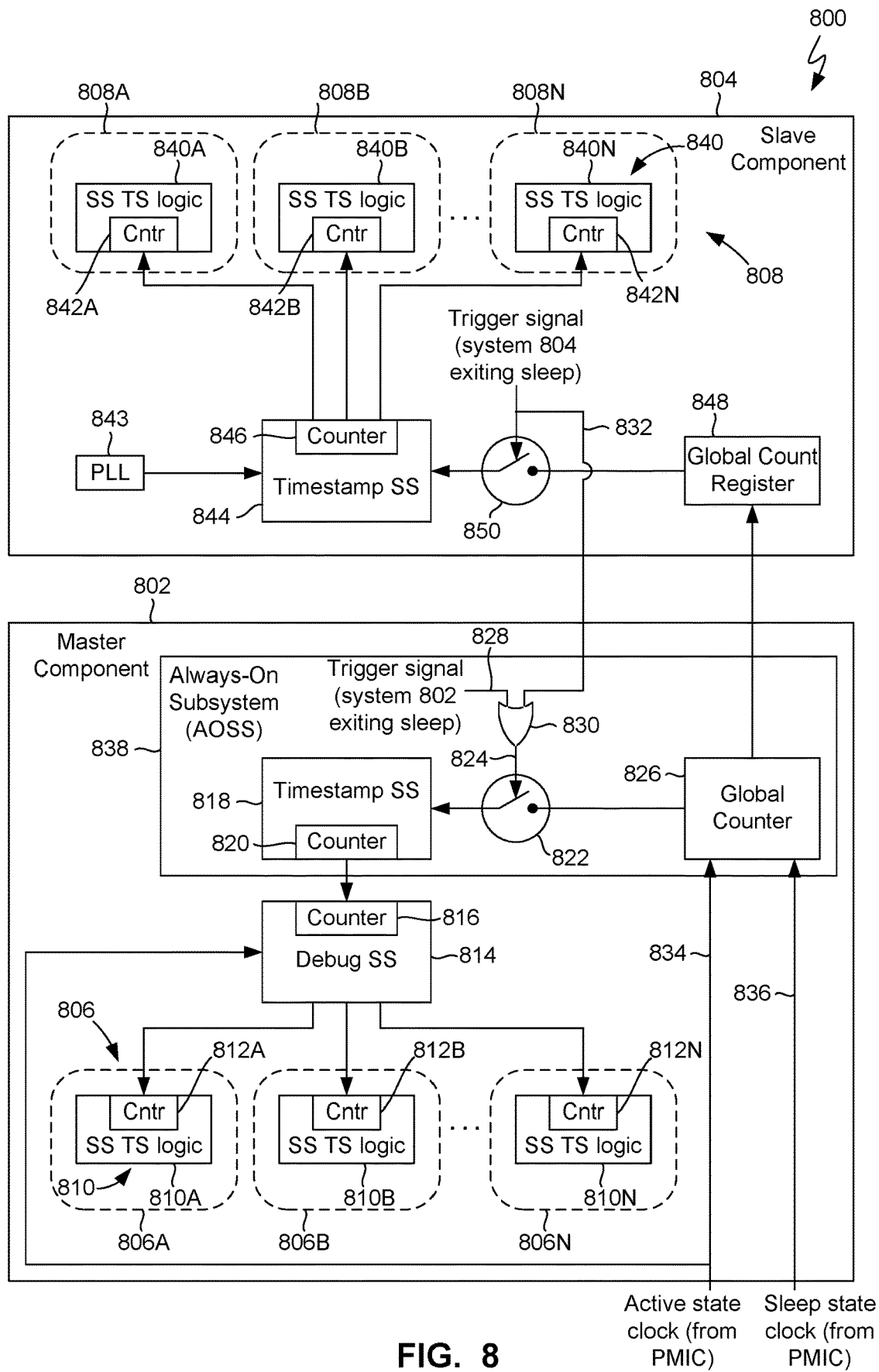
FIG. 8 is a block diagram illustrating another computing device having a system for synchronizing debug time stamp counters, in accordance with exemplary embodiments.

As illustrated in FIG. 8, a computing device 800 may include a master component 802 and a slave component 804. The master component 802 and slave component 804 may be examples of the above-described master component 102 and slave component 104 (FIG. 1), respectively.

The master component 802 may include any number of subsystems 806, such as subsystems 806A, 806B, etc., through 806N. Similarly, the slave component 804 may include any number of subsystems 808, such as subsystems 808A, 808B, etc., through 808N. Each of the subsystems 806 and 808 may be configured to process data packets or other units of data. The master component 802 and slave component 804 may include debug features to facilitate analysis of the data packets, in substantially the same manner as described above with regard to FIG. 1.

A portion of the debug feature may be provided by subsystem ("SS") time stamp ("TS") logic 810, such as subsystem time stamp logic units 810A, 810B, etc., through 810N, in the master component 802. When a debug mode is enabled, each subsystem time stamp logic unit 810 may insert a time stamp into each data packet processed by the corresponding subsystem 806. Each subsystem time stamp logic unit 810A, 810B, etc., through 810N includes a counter 812A, 812B, etc., through 812N, respectively, which may provide the time stamp in the form of its then-current count, i.e., the count at the time the data packet is processed. Each of the counters 812A-812N may be clocked by, and count at the frequency of, the same clock signal on which the remainder of the master component 802 operates. Each of the counters 812A, 812B, etc., may be configured to be loaded with an initial value or count and to count upwardly, i.e., increment its count, beginning from the initial value.

Another portion of the debug feature may be provided by a debug controller or subsystem 814. The debug subsystem 814 controls the subsystem time stamp logic 810. The debug subsystem 814 includes its own counter 816, which may be clocked by, and count at the frequency of, the same clock signal on which the remainder of the master component 802 operates. The counter 816 may be configured to be loaded with an initial value and to count upwardly from the initial value. The debug subsystem 814 may be configured to periodically load the count maintained by its counter 816 into each of the counters 812A-812N of the subsystem time stamp logic 810.

The master component 802 may include a time stamp subsystem 818 that includes a debug counter 820. The debug counter 820 of the time stamp subsystem 818 may be configured to be loaded with an initial value and to count upwardly from the initial value. The time stamp subsystem 818 may be configured to periodically load the count maintained by the debug counter 820 into the counter 816 of the debug subsystem 814. Debug counter loading logic 822 (shown in conceptual form in FIG. 8) may, in response to a preload trigger signal 824, control loading of a count maintained by a global counter 826 into the debug counter 820.

The preload trigger signal 824 may be asserted in response to assertion of a preload signal 828 that indicates the master component 802 is exiting from a sleep state. The preload trigger signal 824 may be asserted not only in response to assertion of the preload signal 828 that indicates the master component 802 is awakening from a sleep state but also, via an OR gate 830, in response to assertion of a similar preload signal 832 that indicates the slave component 804 is awakening from a sleep state. Note that the OR gate 830 may enable synchronizing the debug counters 820 and 846 in instances in which the slave component 804 exits the sleep state while the master component 802 is still in the sleep state. When the master component 802 is in a sleep state, a processor (not separately shown) in the master component 802 may not be operable to assert the preload signal 828.

The global counter 826 may be clocked by the same clock signal on which the remainder of the master component 802 operates. The clock signal on which the master component 802 operates, and which thus may operate the counters 812A-812N, 816 and 820, as well as the global counter 826, may be provided by a power controller (not shown), commonly referred to as a Power Management Integrated Circuit or "PMIC." The global counter 826 may receive an active (i.e., awake) state clock signal 834 and a sleep state clock signal 836 from the PMIC. The active state clock signal 834 may have a higher frequency than the sleep state clock signal 836. For example, the frequency of the active state clock signal 834 may be 19.2 MHz, and the frequency of the sleep state clock signal 836 may be 32 kHz. Although both the active state clock signal 834 and the sleep state clock signal 836 are shown in FIG. 8 for purposes of clarity, only one of them may be used by the global counter 826 at any given time. When the master component 802 is in the active state, i.e., is awake, the global counter 826 may be clocked by (i.e., count in response to) the active state clock signal 834, and when the master component 802 is in the sleep state, the global counter 826 may be clocked by the sleep state clock signal 836. Except for the clock signals 834 and 836 that are shown in FIG. 8 to illustrate that the global counter 826 may be clocked when the master component 802 is in the active state and when the master component 802 is in the sleep state, clock signals in the master component 802 are not shown for purposes of clarity.

The global counter 826 may count at a greater increment when it is clocked by the sleep state clock signal 836 than when it is clocked by the active state clock signal 834. For example, the global counter 826 may count at an increment of one when it is clocked by a 19.2 MHz active state clock signal 834 (i.e., increments the count by one in response to a rising edge of the active state clock signal 834) and may count at an increment of 586 when it is clocked by a 32 kHz sleep state clock signal 836 (i.e., increments the count by 586 in response to a rising clock edge of the sleep state clock signal 836), so that the global counter 826 maintains, on average, substantially the same count regardless of whether the master component 802 is in the sleep state or the active (awake) state.

The master component 802 may include an always-on subsystem ("AOSS") 838 that remains powered regardless of whether the master component 802 is in the active state or the sleep state. The global counter 826, the time stamp subsystem 818, and the debug counter loading logic 822 may be included within the AOSS 838. Therefore, the global counter 826 and the time stamp subsystem 818 (including the debug counter 820) may remain operational (i.e., able to count) when the master component 802 is in the active state as well as when the master component 802 is in the sleep state. The AOSS 838 thus aids debugging when the master component 802 is in the sleep state. When the master component 802 is in the sleep state, time stamps may be inserted in data packets relating to messages transmitted between the master component 802 and the PMIC.

In the illustrated example the slave component 804 may be similar to the above-described master component 802, except that the slave component 804 may not include an AOSS or provide debug-related features in the manner of the debug subsystem 814 of the master component 802. The following elements may be similar to elements correspondingly described above with regard to the master component 802.

The slave component 804 may include subsystem time stamp logic 840, such as subsystem time stamp logic units 840A, 840B, etc., through 840N. When the debug mode is enabled, each subsystem time stamp logic unit 840A-840N may insert a time stamp into each data packet processed by the corresponding subsystem 808. Each subsystem time stamp logic unit 840A, 840B, etc., through 840N includes a counter 842A, 842B, etc., through 842N, respectively, which may provide the time stamp in the form of its then-current count, i.e., the count at the time the data packet is processed. Each of the counters 842A-842N may be clocked by, and count at the frequency of, the same clock signal on which the remainder of the slave component 804 operates. Each of the counters 842A-842N may be configured to be loaded with an initial value (i.e., initial count) and to count upwardly, i.e., increment its count, beginning from the initial value.

It should be noted that the slave component 804 may operate using any clock signal (not shown). In some examples, the frequency of the clock signal on which the slave component 804 operates may be the same as the frequency of the clock signal on which the master component 802 operates. For example, the slave component 804 may receive the active state clock signal from the PMIC, just as the master component 802 does. In such examples, synchronization as described above may be unnecessary. However, in other examples, the frequency of the clock signal on which the slave component 804 operates may be different from the frequency of the clock signal on which the master component 802 operates. For example, the slave component 804 may include a PLL 843 or other circuitry that provides a clock signal on which some or all of the slave component 804 operates. In such other embodiments, the frequency of the clock signal on which one of the master component 802 and the slave component 804 operates may be a multiple of the frequency of the clock signal on which the other of the master component 802 and the slave component 804 operates. As described above, the multiple may be an integer power of two in some examples.

Like the master component 802, the slave component 804 may assume either an active state or a sleep state. When the slave component 804 is in an active state, the slave component 804 may operate in response to an active state clock signal in the slave component 804. When the slave component 804 is in a sleep state, any operational portions of the slave component 804 may operate in response to a sleep state clock signal in the slave component 804. Except for the clock signal provided by the PLL 843 that is depicted in FIG. 8 for the purpose of illustrating an example in which the slave component 804 generates a clock signal, clock signals in the slave component 804 are not shown for purposes of clarity.

The slave component 804 may include a time stamp subsystem 844. The time stamp subsystem 844 may include a debug counter 846. In this exemplary embodiment, the debug counter may be clocked by, and count at the frequency of, the clock signal generated by the PLL 843, which may be the same clock signal on which the remainder of the slave component 804 operates. The debug counter 846 of the time stamp subsystem 844 may be configured to be loaded with an initial value and to count upwardly from the initial value.

The slave component 804 may include a replica global count register 848. The count maintained by the above-described global counter 826 may be periodically loaded into the replica global count register 848, to maintain the replica global count register 848 in synchronism with the global counter 826. For example, the count maintained by the global counter 826 may be loaded into the replica global count register 848 on every cycle of the clock signal on which the master component 802 operates. Note that as the replica global count register 848 and the slave component debug counter 846 are not in an AOSS in the illustrated embodiment, the replica global count register 848 and the debug counter 846 are not powered when the second component 802 is in a sleep state.

Debug counter loading logic 850 (shown in conceptual form in FIG. 8) may, in response to the above-described second preload signal 832, control loading of the count from the replica global count register 848 into the debug counter 846. As described above, the preload signal 832 may be asserted when the slave component 804 exits a sleep state.

A portion of the above-described debug counter loading and synchronization logic 300 (FIG. 3), such as the registers 306 and 308 and the frequency converter 310, may be included in the time stamp subsystem 818 (FIG. 8) of the master component 802. Another portion of the above-described debug counter loading and synchronization logic 300, such as the debug counter loading logic 304, may be included in the debug counter loading logic 822 (FIG. 8) of the master component 802 and may be implemented by, for example, a processor (not shown) to perform the bit shifting and masking in the debug counter 820. Similarly, a portion of the above-described debug counter loading and synchronization logic 300 (FIG. 3), such as the registers 306 and 308 and the frequency converter 310, may be included in the time stamp subsystem 844 (FIG. 8) of the slave component 804. Another portion of the above-described debug counter loading and synchronization logic 300, such as the debug counter loading logic 304, may be included in the debug counter loading logic 850 (FIG. 8) of the slave component 804 and may be implemented by, for example, a processor (not shown) to perform the bit shifting and masking in the debug counter 846. In some embodiments, each master and slave component may include the above-described debug counter loading and synchronization logic 300 (FIG. 3), which may be configured in the manner described above to synchronize their respective debug counter clocks.

Figure 9:
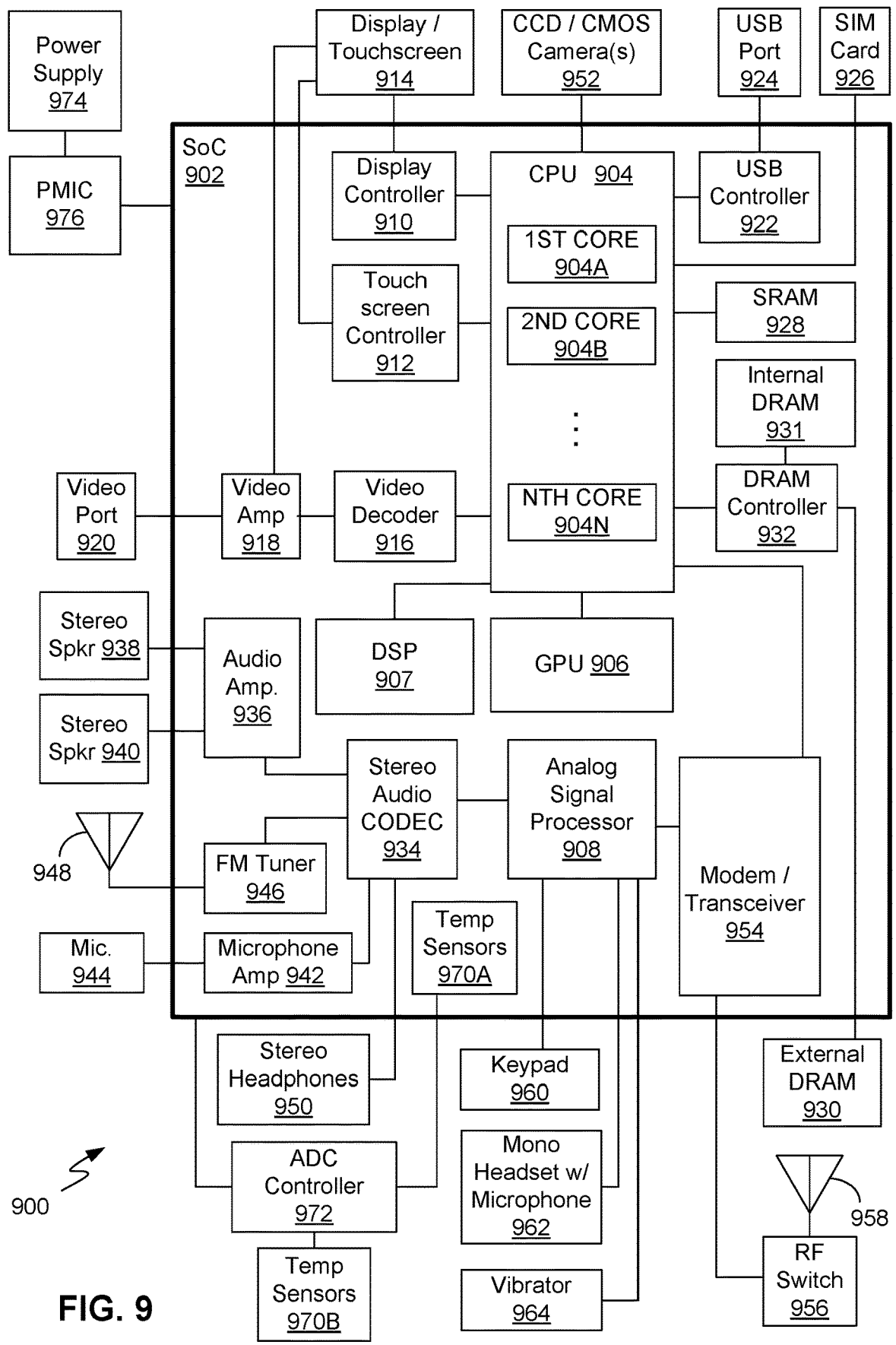
FIG. 9 is a block diagram of a portable computing device, in accordance with exemplary embodiments.

As illustrated in FIG. 9, exemplary embodiments of systems and methods for synchronizing debug time stamp counters in a computing device may be provided in a portable computing device ("PCD") 900. The PCD 900 may be an example of the computing device 100 described above with regard to FIG. 1.

The PCD 900 may include an SoC 902. The SoC 902 may be an example of one of the components 102 and 104 described above with regard to FIG. 1. Alternatively, any two systems or components within the SoC 902 having characteristics that are not inconsistent with the above-described characteristics of the components 102 and 104 may be examples of the components 102 and 104.

The SoC 902 may include a CPU 904, a GPU 906, a DSP 907, an analog signal processor 908, or other processors. The CPU 904 may include multiple cores, such as a first core 904A, a second core 904B, etc., through an Nth core 904N. In some examples of the SoC 902, the CPU 904 may be referred to as an application processor.

A display controller 910 and a touch-screen controller 912 may be coupled to the CPU 904. A touchscreen display 914 external to the SoC 902 may be coupled to the display controller 910 and the touch-screen controller 912. The PCD 900 may further include a video decoder 916 coupled to the CPU 904. A video amplifier 918 may be coupled to the video decoder 916 and the touchscreen display 914. A video port 920 may be coupled to the video amplifier 918. A universal serial bus ("USB") controller 922 may also be coupled to CPU 904, and a USB port 924 may be coupled to the USB controller 922. A subscriber identity module ("SIM") card 926 may also be coupled to the CPU 904.

One or more memories may be coupled to the CPU 904. The one or more memories may include both volatile and non-volatile memories. Examples of volatile memories include static random access memory ("SRAM") 928 and dynamic RAMs ("DRAM"s) 930 and 931. Such memories may be external to the SoC 902, such as the DRAM 930, or internal to the SoC 902, such as the DRAM 931. A DRAM controller 932 coupled to the CPU 904 may control the writing of data to, and reading of data from, the DRAMs 930 and 931. In other embodiments, such a DRAM controller may be included within a processor, such as the CPU 904.

A stereo audio CODEC 934 may be coupled to the analog signal processor 908. Further, an audio amplifier 936 may be coupled to the stereo audio CODEC 934. First and second stereo speakers 938 and 940, respectively, may be coupled to the audio amplifier 936. In addition, a microphone amplifier 942 may be coupled to the stereo audio CODEC 934, and a microphone 944 may be coupled to the microphone amplifier 942. A frequency modulation ("FM") radio tuner 946 may be coupled to the stereo audio CODEC 934. An FM antenna 948 may be coupled to the FM radio tuner 946. Further, stereo headphones 950 may be coupled to the stereo audio CODEC 934. Other devices that may be coupled to the CPU 904 include one or more digital (e.g., CCD or CMOS) cameras 952. In addition, a keypad 960, a mono headset with a microphone 962, and a vibrator device 964 may be coupled to the analog signal processor 908.

A radio frequency (RF) transceiver or modem 954 may be coupled to the analog signal processor 908 and CPU 904. An RF switch 956 may be coupled to the modem 954 and an RF antenna 958. The CPU 904 and the modem 954 may be examples of the above-described components 102 and 104 (FIG. 1). Although in the illustrated embodiment the modem 954 is included within the same SoC 902 having the CPU 904 and various other processors, in other embodiments such a modem may be external to such an SoC, e.g., a separate chip, and may itself be referred to as a type of SoC.

The SoC 902 may have one or more internal or on-chip thermal sensors 970A and may be coupled to one or more external or off-chip thermal sensors 970B. An analog-to-digital converter ("ADC") controller 972 may convert voltage drops produced by the thermal sensors 970A and 970B to digital signals. A power supply 974 and a PMIC 976 may supply power to the SoC 902.

Implementation examples are described in the following numbered clauses:

1. A method for synchronizing debug time stamp counters in a computing device, comprising:
    loading a replica global counter in a second component from a first global counter in a first component;
    loading a first debug time stamp counter in the first component from the first global counter in response to a first preload signal indicating awakening of the first component from a sleep state or in response to a second preload signal indicating awakening of the second component from the sleep state; and
    loading a second debug time stamp counter in the second component from the replica global counter in response to the second preload signal.

2. The method of clause 1, further comprising synchronizing the first debug time stamp counter and the second debug time stamp counter.

3. The method of clause 2, further comprising determining whether a second clock frequency of a second clock signal associated with the second debug time stamp counter is an integer (n) power-of-two multiple of a first clock frequency of a first clock signal associated with the first debug time stamp counter.

4. The method of clause 3, wherein, if the second clock frequency is an integer (n) power-of-two multiple of the first clock frequency, synchronizing the first debug time stamp counter and the second debug time stamp counter comprises:
    loading a count of the first global counter into first debug time stamp counter bit positions shifted left by n bits;
    masking n least-significant bits of the first debug time stamp counter; and
    loading a count of the replica global counter into second debug time stamp counter bit positions shifted left by n bits.

5. The method of clause 3, wherein, if the second clock frequency is not an integer power-of-two multiple of the first clock frequency, synchronizing the first debug time stamp counter and the second debug time stamp counter comprises:
    applying an averaged clock signal to the second debug time stamp counter, the averaged clock signal reflecting periodically suppressed clock pulses of the second clock signal to provide an average clock frequency substantially equal to the first clock frequency.

6. The method of clause 1, wherein the first debug time stamp counter and the first global counter remain operational when the first component is in the sleep state, and the first preload signal is not generated if the first component is in the sleep state.

7. The method of clause 1, wherein the first component is a first integrated circuit chip, and the second component is a second integrated circuit chip.

8. The method of clause 1, wherein the first component is a first chiplet of an integrated circuit chip, and the second component is a second chiplet of the integrated circuit chip.

9. A system for synchronizing debug time stamp counters in a computing device, comprising:
   a first component having a first global counter and a first debug time stamp counter, the first component configured to produce a first preload signal indicating awakening of the first component from a sleep state and to load the first debug time stamp counter from the first global counter in response to the first preload signal; and
   a second component having a replica global counter and a second debug time stamp counter, the second component configured to produce a second preload signal indicating awakening of the second component from the sleep state and to load the second debug time stamp counter from the replica global counter in response to the second preload signal, the second component further configured to load the replica global counter from the first global counter, the first component further configured to load the first debug time stamp counter in response to the second preload signal.

10. The system of clause 9, wherein the first component and the second component are further configured to synchronize the first debug time stamp counter and the second debug time stamp counter.

11. The system of clause 10, wherein the first component and the second component are further configured to determine whether a second clock frequency of a second clock signal associated with the second debug time stamp counter is an integer (n) power-of-two multiple of a first clock frequency of a first clock signal associated with the first debug time stamp counter.

12. The system of clause 11, wherein the first component and the second component are configured to synchronize the first debug time stamp counter and the second debug time stamp counter by being configured, if the second clock frequency is an integer (n) power-of-two multiple of the first clock frequency, to:
   load a count of the first global counter into first debug time stamp counter bit positions shifted left by n bits;
   mask n least-significant bits of the first debug time stamp counter; and
   load a count of the replica global counter into second debug time stamp counter bit positions shifted left by n bits.

13. The system of clause 11, wherein the first component and the second component are configured to synchronize the first debug time stamp counter and the second debug time stamp counter by being configured, if the second clock frequency is not an integer power-of-two multiple of the first clock frequency, to:
   apply an averaged clock signal to the second debug time stamp counter, the averaged clock signal reflecting periodically suppressed clock pulses of the second clock signal to provide an average clock frequency substantially equal to the first clock frequency.

14. The system of clause 9, wherein the first debug time stamp counter and the first global counter remain operational when the first component is in the sleep state, and the first preload signal is not generated if the first component is in the sleep state.

15. The system of clause 9, wherein the first component is a first integrated circuit chip, and the second component is a second integrated circuit chip.

16. The system of clause 9, wherein the first component is a first chiplet of an integrated circuit chip, and the second component is a second chiplet of the integrated circuit chip.

17. A system for synchronizing debug time stamp counters in a computing device, comprising:
   means for loading a replica global counter in a second component from a first global counter in a first component;
   means for loading a first debug time stamp counter in the first component from the first global counter in response to a first preload signal indicating awakening of the first component from a sleep state or in response to a second preload signal indicating awakening of the second component from the sleep state; and
   means for loading a second debug time stamp counter in the second component from the replica global counter in response to the second preload signal.

18. The system of clause 17, further comprising means for synchronizing the first debug time stamp counter and the second debug time stamp counter.

19. The system of clause 18, further comprising means for determining whether a second clock frequency of a second clock signal associated with the second debug time stamp counter is an integer (n) power-of-two multiple of a first clock frequency of a first clock signal associated with the first debug time stamp counter.

20. The system of clause 19, wherein, if the second clock frequency is an integer (n) power-of-two multiple of the first clock frequency, the means for synchronizing the first debug time stamp counter and the second debug time stamp counter comprises:
   means for loading a count of the first global counter into first debug time stamp counter bit positions shifted left by n bits;
   means for masking n least-significant bits of the first debug time stamp counter; and
   means for loading a count of the replica global counter into second debug time stamp counter bit positions shifted left by n bits.

21. The system of clause 19, wherein, if the second clock frequency is not an integer power-of-two multiple of the first clock frequency, synchronizing the first debug time stamp counter and the second debug time stamp counter comprises:
   means for applying an averaged clock signal to the second debug time stamp counter, the averaged clock signal reflecting periodically suppressed clock pulses of the second clock signal to provide an average clock frequency substantially equal to the first clock frequency.

22. The system of clause 17, wherein the first debug time stamp counter and the first global counter remain operational when the first component is in the sleep state, and the first preload signal is not generated if the first component is in the sleep state.

23. The system of clause 17, wherein the first component is a first integrated circuit chip, and the second component is a second integrated circuit chip.

24. The system of clause 17, wherein the first component is a first chiplet of an integrated circuit chip, and the second component is a second chiplet of the integrated circuit chip.

25. A computer-readable medium for synchronizing debug time stamp counters in a computing device, the computer-readable medium comprising a non-transitory computer-readable medium having stored thereon in computer-executable form instructions that when executed by a processing system of the computing device configure the processing system to:

load a replica global counter in a second component from a first global counter in a first component;

load a first debug time stamp counter in the first component from the first global counter in response to a first preload signal indicating awakening of the first component from a sleep state or in response to a second preload signal indicating awakening of the second component from the sleep state; and load a second debug time stamp counter in the second component from the replica global counter in response to the second preload signal.

26. The computer-readable medium of clause 25, wherein the instructions further configure the processing system to synchronize the first debug time stamp counter and the second debug time stamp counter.

27. The computer-readable medium of clause 26, wherein the instructions further configure the processing system to determine whether a second clock frequency of a second clock signal associated with the second debug time stamp counter is an integer (n) power-of-two multiple of a first clock frequency of a first clock signal associated with the first debug time stamp counter.

28. The computer-readable medium of clause 27, wherein, if the second clock frequency is an integer (n) power-of-two multiple of the first clock frequency, the instructions configure the processing system to synchronize the first debug time stamp counter and the second debug time stamp counter by configuring the processing system to:

load a count of the first global counter into first debug time stamp counter bit positions shifted left by n bits;

mask n least-significant bits of the first debug time stamp counter; and load a count of the replica global counter into second debug time stamp counter bit positions shifted left by n bits.

29. The computer-readable medium of clause 27, wherein, if the second clock frequency is not an integer power-of-two multiple of the first clock frequency, the instructions configure the processing system to synchronize the first debug time stamp counter and the second debug time stamp counter by configuring the processing system to:

apply an averaged clock signal to the second debug time stamp counter, the averaged clock signal reflecting periodically suppressed clock pulses of the second clock signal to provide an average clock frequency substantially equal to the first clock frequency.

30. The computer-readable medium of clause 25, wherein the first debug time stamp counter and the first global counter remain operational when the first component is in the sleep state, and the first preload signal is not generated if the first component is in the sleep state.

Firmware or software may be stored in any of the above-described memories, such as DRAM 930 or 931, SRAM 928, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Debug time stamp counter synchronization in a computing device may be embodied in any of the exemplary systems, methods, computer-readable media, etc., described above. Although in an exemplary embodiment the computing device may be the above-described PCD 900, in other embodiments the computing device may be of any type. Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for synchronizing debug time stamp counters in a computing device, comprising:

loading a replica global counter in a second component from a first global counter in a first component;

loading a first debug time stamp counter in the first component from the first global counter in response to a first preload signal indicating awakening of the first component from a sleep state or in response to a second preload signal indicating awakening of the second component from the sleep state; and loading a second debug time stamp counter in the second component from the replica global counter in response to the second preload signal.

2. The method of claim 1, further comprising synchronizing the first debug time stamp counter and the second debug time stamp counter.

3. The method of claim 2, further comprising determining whether a second clock frequency of a second clock signal associated with the second debug time stamp counter is an integer (n) power-of-two multiple of a first clock frequency of a first clock signal associated with the first debug time stamp counter.

4. The method of claim 3, wherein, if the second clock frequency is an integer (n) power-of-two multiple of the first clock frequency, synchronizing the first debug time stamp counter and the second debug time stamp counter comprises:

loading a count of the first global counter into first debug time stamp counter bit positions shifted left by n bits;

masking n least-significant bits of the first debug time stamp counter; and loading a count of the replica global counter into second debug time stamp counter bit positions shifted left by n bits.

5. The method of claim 3, wherein, if the second clock frequency is not an integer power-of-two multiple of the first clock frequency, synchronizing the first debug time stamp counter and the second debug time stamp counter comprises:

applying an averaged clock signal to the second debug time stamp counter, the averaged clock signal reflecting periodically suppressed clock pulses of the second clock signal to provide an average clock frequency substantially equal to the first clock frequency.

6. The method of claim 1, wherein the first debug time stamp counter and the first global counter remain operational when the first component is in the sleep state, and the first preload signal is not generated if the first component is in the sleep state.

7. The method of claim 1, wherein the first component is a first integrated circuit chip, and the second component is a second integrated circuit chip.

8. The method of claim 1, wherein the first component is a first chiplet of an integrated circuit chip, and the second component is a second chiplet of the integrated circuit chip.

9. A system for synchronizing debug time stamp counters in a computing device, comprising:

a first component having a first global counter and a first debug time stamp counter, the first component configured to produce a first preload signal indicating awakening of the first component from a sleep state and to load the first debug time stamp counter from the first global counter in response to the first preload signal; and a second component having a replica global counter and a second debug time stamp counter, the second component configured to produce a second preload signal indicating awakening of the second component from the sleep state and to load the second debug time stamp counter from the replica global counter in response to the second preload signal, the second component further configured to load the replica global counter from the first global counter, the first component further configured to load the first debug time stamp counter in response to the second preload signal.

10. The system of claim 9, wherein the first component and the second component are further configured to synchronize the first debug time stamp counter and the second debug time stamp counter.

11. The system of claim 10, wherein the first component and the second component are further configured to determine whether a second clock frequency of a second clock signal associated with the second debug time stamp counter is an integer (n) power-of-two multiple of a first clock frequency of a first clock signal associated with the first debug time stamp counter.

12. The system of claim 11, wherein the first component and the second component are configured to synchronize the first debug time stamp counter and the second debug time stamp counter by being configured, if the second clock frequency is an integer (n) power-of-two multiple of the first clock frequency, to:

load a count of the first global counter into first debug time stamp counter bit positions shifted left by n bits;

mask n least-significant bits of the first debug time stamp counter; and load a count of the replica global counter into second debug time stamp counter bit positions shifted left by n bits.

13. The system of claim 11, wherein the first component and the second component are configured to synchronize the first debug time stamp counter and the second debug time stamp counter by being configured, if the second clock frequency is not an integer power-of-two multiple of the first clock frequency, to:

apply an averaged clock signal to the second debug time stamp counter, the averaged clock signal reflecting periodically suppressed clock pulses of the second clock signal to provide an average clock frequency substantially equal to the first clock frequency.

14. The system of claim 9, wherein the first debug time stamp counter and the first global counter remain operational when the first component is in the sleep state, and the first preload signal is not generated if the first component is in the sleep state.

15. The system of claim 9, wherein the first component is a first integrated circuit chip, and the second component is a second integrated circuit chip.

16. The system of claim 9, wherein the first component is a first chiplet of an integrated circuit chip, and the second component is a second chiplet of the integrated circuit chip.

17. A system for synchronizing debug time stamp counters in a computing device, comprising:

means for loading a replica global counter in a second component from a first global counter in a first component;

means for loading a first debug time stamp counter in the first component from the first global counter in response to a first preload signal indicating awakening of the first component from a sleep state or in response to a second preload signal indicating awakening of the second component from the sleep state; and means for loading a second debug time stamp counter in the second component from the replica global counter in response to the second preload signal.

18. The system of claim 17, further comprising means for synchronizing the first debug time stamp counter and the second debug time stamp counter.

19. The system of claim 18, further comprising means for determining whether a second clock frequency of a second clock signal associated with the second debug time stamp counter is an integer (n) power-of-two multiple of a first clock frequency of a first clock signal associated with the first debug time stamp counter.

20. The system of claim 19, wherein, if the second clock frequency is an integer (n) power-of-two multiple of the first clock frequency, the means for synchronizing the first debug time stamp counter and the second debug time stamp counter comprises:

means for loading a count of the first global counter into first debug time stamp counter bit positions shifted left by n bits;

means for masking n least-significant bits of the first debug time stamp counter; and means for loading a count of the replica global counter into second debug time stamp counter bit positions shifted left by n bits.

21. The system of claim 19, wherein, if the second clock frequency is not an integer power-of-two multiple of the first clock frequency, synchronizing the first debug time stamp counter and the second debug time stamp counter comprises:

means for applying an averaged clock signal to the second debug time stamp counter, the averaged clock signal reflecting periodically suppressed clock pulses of the second clock signal to provide an average clock frequency substantially equal to the first clock frequency.

22. The system of claim 17, wherein the first debug time stamp counter and the first global counter remain operational when the first component is in the sleep state, and the first preload signal is not generated if the first component is in the sleep state.

23. The system of claim 17, wherein the first component is a first integrated circuit chip, and the second component is a second integrated circuit chip.

24. The system of claim 17, wherein the first component is a first chiplet of an integrated circuit chip, and the second component is a second chiplet of the integrated circuit chip.

25. A computer-readable medium for synchronizing debug time stamp counters in a computing device, the computer-readable medium comprising a non-transitory computer-readable medium having stored thereon in computer-executable form instructions that when executed by a processing system of the computing device configure the processing system to:

load a replica global counter in a second component from a first global counter in a first component;

load a first debug time stamp counter in the first component from the first global counter in response to a first preload signal indicating awakening of the first component from a sleep state or in response to a second preload signal indicating awakening of the second component from the sleep state; and load a second debug time stamp counter in the second component from the replica global counter in response to the second preload signal.

26. The computer-readable medium of claim 25, wherein the instructions further configure the processing system to synchronize the first debug time stamp counter and the second debug time stamp counter.

27. The computer-readable medium of claim 26, wherein the instructions further configure the processing system to determine whether a second clock frequency of a second clock signal associated with the second debug time stamp counter is an integer (n) power-of-two multiple of a first clock frequency of a first clock signal associated with the first debug time stamp counter.

28. The computer-readable medium of claim 27, wherein, if the second clock frequency is an integer (n) power-of-two multiple of the first clock frequency, the instructions configure the processing system to synchronize the first debug time stamp counter and the second debug time stamp counter by configuring the processing system to:
  load a count of the first global counter into first debug time stamp counter bit positions shifted left by n bits;
  mask n least-significant bits of the first debug time stamp counter; and
  load a count of the replica global counter into second debug time stamp counter bit positions shifted left by n bits.

29. The computer-readable medium of claim 27, wherein, if the second clock frequency is not an integer power-of-two multiple of the first clock frequency, the instructions configure the processing system to synchronize the first debug time stamp counter and the second debug time stamp counter by configuring the processing system to:
  apply an averaged clock signal to the second debug time stamp counter, the averaged clock signal reflecting periodically suppressed clock pulses of the second clock signal to provide an average clock frequency substantially equal to the first clock frequency.

30. The computer-readable medium of claim 25, wherein the first debug time stamp counter and the first global counter remain operational when the first component is in the sleep state, and the first preload signal is not generated if the first component is in the sleep state.

* * * * *